United States Patent
Yang et al.

(10) Patent No.: US 10,724,466 B2
(45) Date of Patent: Jul. 28, 2020

(54) PISTON FOR VEHICLE ENGINE AND METHOD FOR MANUFACTURING THE SAME

(71) Applicant: Dong Yang Piston Co., Ltd., Ansan-si (KR)

(72) Inventors: Jun-Kui Yang, Seoul (KR); Kwan-Ho Ryu, Ansan-si (KR); Jeong-Keun Lee, Incheon-si (KR); Ju-Hyun Sun, Incheon-si (KR); Sang-Bean Park, Siheung-si (KR); Jung-Hun Ji, Ansan-si (KR)

(73) Assignee: DONG YANG PISTON CO., LTD., Ansan-si (KR)

( * ) Notice: Subject to any disclaimer, the term of this patent is extended or adjusted under 35 U.S.C. 154(b) by 151 days.

(21) Appl. No.: 15/817,405

(22) Filed: Nov. 20, 2017

(65) Prior Publication Data

US 2018/0156156 A1   Jun. 7, 2018

(30) Foreign Application Priority Data

Dec. 7, 2016   (KR) .................. 10-2016-0165767

(51) Int. Cl.
*F02F 3/00*   (2006.01)
*B23P 15/10*   (2006.01)
(Continued)

(52) U.S. Cl.
CPC .......... *F02F 3/0015* (2013.01); *B23K 1/0008* (2013.01); *B23K 1/008* (2013.01);
(Continued)

(58) Field of Classification Search
CPC .......... F02F 3/0015; F02F 3/003; F02F 3/084; F02F 2003/0038; F02F 2200/00;
(Continued)

(56) References Cited

U.S. PATENT DOCUMENTS

| 6,109,505 A * | 8/2000 | Malie ................ B23K 35/0244 |
| | | 228/119 |
| 2008/0199718 A1* | 8/2008 | Sjodin ...................... B22F 9/04 |
| | | 428/594 |

(Continued)

FOREIGN PATENT DOCUMENTS

| DE | 2730120 A1 | 1/1979 |
| DE | 10-2007-035849 A1 | 2/2009 |

(Continued)

OTHER PUBLICATIONS

The Extended Search Report for European Application No. 17201604.0 dated May 22, 2018.

(Continued)

*Primary Examiner* — Bayan Salone

(57) ABSTRACT

There is provided a method for manufacturing a piston, including: a piston assembling step of forming a piston assembly by assembling a first piston part, a bonding member and a second piston part, wherein the first piston part has two or more bonding surfaces separate from each other and extending in a circumferential direction, and the second piston part has two or more bonding surfaces separate from each other and extending in the circumferential direction; a piston diffusion brazing step of diffusion brazing the first piston part, the bonding member and the second piston part under an open atmosphere by heating the formed piston assembly; and a piston cooling step of cooling a piston unit formed by diffusion brazing the first piston part, the bonding member and the second piston part. The piston diffusion brazing step is performed in a piston manufacturing device which includes a partially opened heating zone, a heater for providing heat into the heating zone, and a moving unit moved in one direction in the heating zone. In the piston diffusion brazing step, the piston assembly is heated while (Continued)

being moved at a predetermined speed through the heating zone in one direction by the moving unit.

17 Claims, 12 Drawing Sheets

(51) Int. Cl.
*B23K 1/00* (2006.01)
*B23K 1/008* (2006.01)
*B23K 101/00* (2006.01)

(52) U.S. Cl.
CPC ............... *B23P 15/10* (2013.01); *F02F 3/003* (2013.01); *F02F 3/0084* (2013.01); *B23K 2101/003* (2018.08); *F02F 2003/0038* (2013.01); *F02F 2200/00* (2013.01)

(58) Field of Classification Search
CPC ............... F02F 2003/0061; B23P 15/10; B23P 2700/50; B23K 1/008; B23K 1/0008; B23K 2101/003; F16J 1/005

See application file for complete search history.

(56) References Cited

U.S. PATENT DOCUMENTS

| | | | | |
|---|---|---|---|---|
| 2009/0158925 | A1* | 6/2009 | Scharp | F02F 3/003 |
| | | | | 92/176 |
| 2013/0062399 | A1* | 3/2013 | McQuirk | B23K 1/0012 |
| | | | | 228/262.51 |
| 2015/0007717 | A1* | 1/2015 | Yang | F16J 1/09 |
| | | | | 92/172 |
| 2015/0053389 | A1* | 2/2015 | Sjodin | B22F 9/04 |
| | | | | 165/185 |

FOREIGN PATENT DOCUMENTS

| | | |
|---|---|---|
| JP | 3114278 B2 | 12/2000 |
| KR | 10-2005-0097566 A | 10/2005 |
| KR | 10-2012-0049882 A | 5/2012 |
| KR | 10-2014-0027046 A | 3/2014 |
| KR | 10-2014-0098826 A | 8/2014 |
| KR | 10-2016-0128067 A | 11/2016 |
| KR | 2016-0128067 A | 11/2016 |
| WO | 2006/126953 A1 | 11/2006 |
| WO | 2011/128624 A1 | 10/2011 |

OTHER PUBLICATIONS

The Office Action for European Application No. 17201604.0 dated Jan. 18, 2019.

* cited by examiner

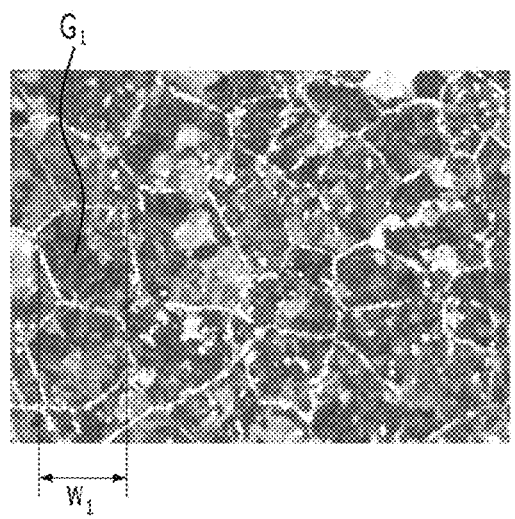 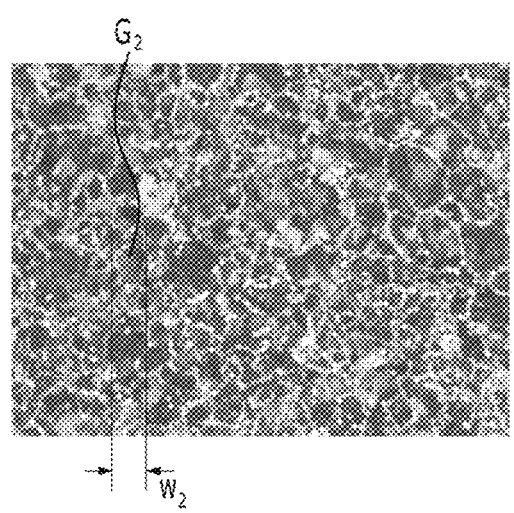
FIG. 9A  FIG. 9B

PISTON FOR VEHICLE ENGINE AND METHOD FOR MANUFACTURING THE SAME

CROSS-REFERENCE TO RELATED APPLICATION(S)

This application claims benefit of priority to Korean Patent Application No. 10-2016-0165767 filed on Dec. 7, 2016 in the Korean Intellectual Property Office, the disclosure of which is incorporated herein by reference in its entirety.

BACKGROUND

1. Field

The present disclosure relates to a piston for a vehicle engine and a method for manufacturing the same, and more particularly, to a piston for a vehicle engine, which has a cooling gallery formed therein, and a method for manufacturing the same.

2. Description of Related Art

An internal combustion engine of a vehicle may include a piston made of steel. The piston may have a cooling gallery that rapidly cools high-temperature heat generated during a fuel combustion process, in order to prevent a damage of the piston.

In order to form the cooling gallery, an upper piston part having a valve pocket and combustion cavity formed therein and a lower piston part having a piston skirt and piston pin hole formed therein may be separately manufactured and welded to each other.

Exemplary methods of welding the upper and lower piston parts to each other may include friction welding, brazing and the like.

U.S. Pat. No. 6,260,472 discloses a process of manufacturing a steel piston through friction welding. However, during a process of welding upper and lower piston parts through friction welding, flashing may be formed and remain in a cooling gallery, thereby disturbing a fluid flow in the cooling gallery.

U.S. Pat. No. 8,991,046 discloses a process of manufacturing a steel piston through brazing bonding. According to this process, heating and cooling are performed in a sealed chamber. Thus, the productivity of the process is inevitably degraded.

SUMMARY

An object of the present disclosure is to provide a piston for a vehicle engine and a method for manufacturing the same which may improve productivity.

According to an embodiment of the present disclosure, a method for manufacturing a piston for a vehicle engine includes: a piston assembling step of forming a piston assembly by assembling a first piston part, a bonding member and a second piston part, wherein the first piston part has two or more bonding surfaces separate from each other and extending in a circumferential direction, and the second piston part has two or more bonding surfaces separate from each other and extending in the circumferential direction; a piston diffusion brazing step of diffusion brazing the first piston part, the bonding member and the second piston part under an open atmosphere by heating the formed piston assembly; and a piston cooling step of cooling a piston unit formed by diffusion brazing the first piston part, the bonding member and the second piston part. The piston diffusion brazing step is performed in a piston manufacturing device which includes a partially opened heating zone, a heater for providing heat into the heating zone, and a moving unit moved in one direction in the heating zone. In the piston diffusion brazing step, the piston assembly is heated while being moved at a predetermined speed through the heating zone in one direction by the moving unit.

In the piston assembling step, the bonding surfaces of the first piston part may include a ring-shaped first bonding surface and a second bonding surface disposed further inside than the first bonding surface, the bonding surfaces of the second piston part may include a ring-shaped third bonding surface and a fourth bonding surface disposed further inside than the third bonding surface, and the first and second bonding surfaces of the first piston part may face the third and fourth bonding surfaces of the second piston part, respectively, with the bonding member interposed therebetween.

The bonding member may include a bonding member body formed in a circular plate shape, and have a through-hole formed in the center of the bonding member body. One surface of the bonding member body may be in contact with the first and second bonding surfaces, and the other surface of the bonding member body may be in contact with the third and fourth bonding surfaces.

The first and second piston parts may comprise steel, and the bonding member may comprise a nickel-based alloy. In the piston diffusion brazing step, a diffusion layer containing a nickel-based alloy may be formed on the inner surface of a cooling gallery formed by bonding the first and second bonding surfaces of the first piston part and the third and fourth bonding surfaces of the second piston part, respectively.

The piston diffusion brazing step may include: a preheating step of heating the piston assembly formed at room temperature to a preheating temperature from the room temperature, the preheating temperature being lower than the melting temperature of the bonding member; and a main heating step of diffusion brazing the first piston part, the bonding member and the second piston part of the piston assembly by heating the piston assembly heated to the preheating temperature through the preheating step at a main heating temperature higher than the melting temperature of the bonding member.

The preheating step may be performed in a preheating zone of the heating zone, the preheating zone including two or more sub preheating zones, a first preheating temperature of a first sub preheating zone may be lower than a second preheating temperature of a second sub preheating zone disposed at the rear of the first sub preheating zone, and the preheating temperatures of the sub preheating zones may be constantly maintained.

The first preheating temperature may be higher than 500° C. and lower than 800° C., and the second preheating temperature may be higher than 800° C. and lower than 1,200° C.

The main heating step may be performed in a main heating zone which is disposed at the rear of the preheating zone of the heating zone and communicates with the preheating zone, and the main heating zone may have an internal temperature maintained at the main heating temperature.

The main heating temperature may be higher than 1,000° C. and lower than 1,300° C.

The second piston part may include a piston skirt and a piston pin hole, and the plurality of piston assemblies each including the first piston part, the bonding member and the second piston part, which are sequentially stacked, may be successively moved by the moving unit.

The method may further include a jig installation step of installing a jig for maintaining an alignment state of the first piston part, the bonding member and the second piston part, after the piston assembly is formed. The jig may press the second piston part against the first piston part.

A gas mixture may be supplied to the heating zone, and then discharged externally through the heating zone.

The heating zone may include a preheating zone and a main heating zone disposed at the rear of the preheating zone, and the gas mixture may be introduced into the heating zone through a gas discharge port installed in the main heating zone.

The piston manufacturing device may further include a cooling zone disposed at the rear of the heating zone and having first and second cooling zones communicating with each other, wherein the first cooling zone has an internal temperature that decreases to a cooling temperature from a main heating temperature higher than the melting temperature of the bonding member, and the second cooling zone communicates with the first cooling zone and has an internal temperature maintained at the cooling temperature. The piston cooling step may include: a first cooling step of cooling the piston unit in the first cooling zone; and a second cooling step of cooling the piston unit subjected to the first cooling step in the second cooling zone.

The time during which one piston unit stays in the second cooling zone may be two to four times longer than the time during which the same piston unit stays in the first cooling zone.

Any one of the first and second piston parts may further include a latch protruding in a ring shape to cover a portion of the other piston part, and the method may further include a piston processing step of removing the latch from the cooled piston unit.

The piston unit subjected to the piston cooling step may have a smaller metal grain size than the piston assembly before the piston assembling step.

According to another embodiment of the present disclosure, a piston for a vehicle engine includes a piston unit comprising steel and having a piston body and a cooling gallery formed in the piston body. The piston body has a bonding interface formed in parallel to the top surface of the piston body and passing through the cooling gallery, and the concentration of a metal different from the material of the piston body decreases from the center of the bonding interface toward an outside of the bonding surface.

According to another embodiment of the present disclosure, a method for manufacturing a piston for a vehicle engine includes: a piston assembling step of forming a piston assembly by assembling a first piston part, a bonding member and a second piston part, wherein the first piston part has two or more bonding surfaces separate from each other and extending in a circumferential direction, and the second piston part has two or more bonding surfaces separate from each other and extending in the circumferential direction; a piston diffusion brazing step of diffusion brazing the first piston part, the bonding member and the second piston part under an open atmosphere by heating the formed piston assembly; and a piston cooling step of cooling a piston unit formed by diffusion brazing the first piston part, the bonding member and the second piston part. The piston diffusion brazing step is performed in a piston manufacturing device including a partially opened heating zone, a heater for providing heat into the heating zone, and a moving unit moved in one direction in the heating zone. In the piston diffusion brazing step, the piston assembly is heated while being moved at a predetermined speed through the heating zone in the one direction by the moving unit.

A diffusion layer containing the different metal may be formed on the inner surface of the cooling gallery, and the different metal may include a nickel-based alloy.

According to the embodiments of the present disclosure, since the piston for a vehicle engine and the method for manufacturing the same can improve the productivity, a large quantity of pistons for a vehicle engine can be manufactured at a lower cost for a shorter time.

BRIEF DESCRIPTION OF DRAWINGS

FIGS. 9A and 9B illustrate the metal texture sizes of the piston before and after the piston manufacturing process by the piston manufacturing device of FIG. 6.

DETAILED DESCRIPTION

Figure 1:
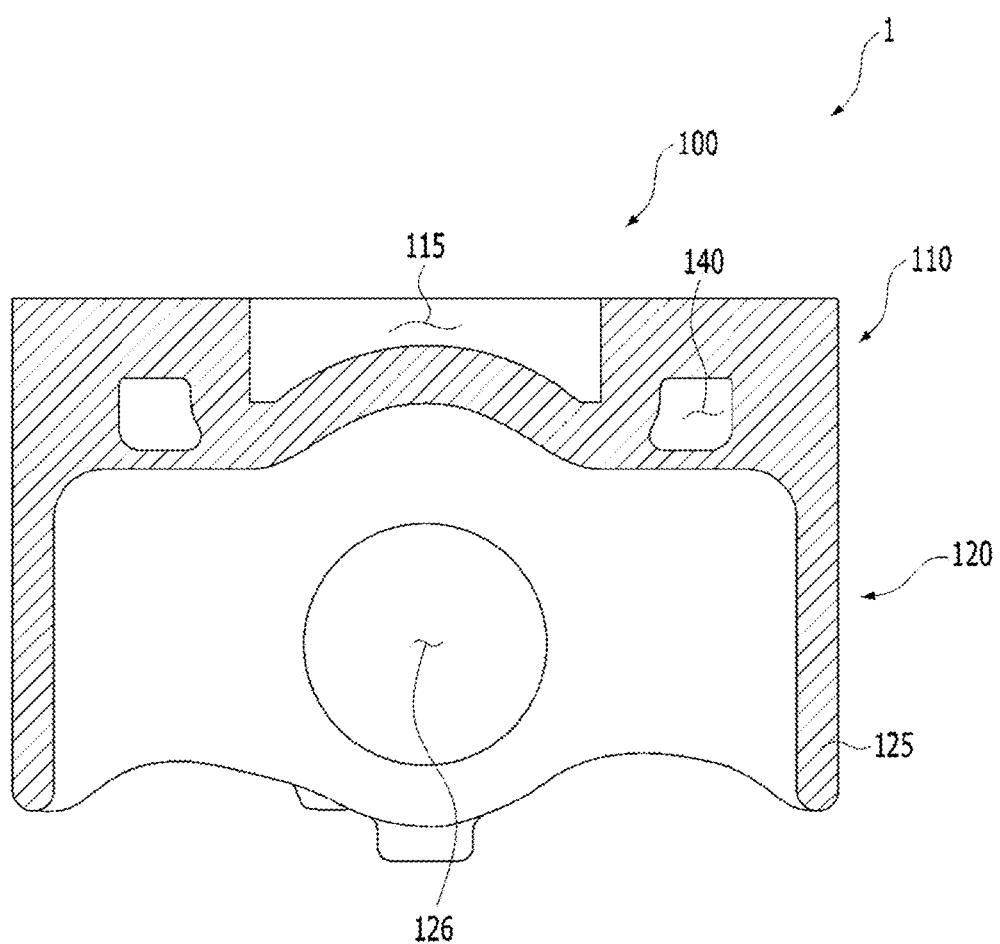
FIG. 1 illustrates a cross-section of a piston for a vehicle engine according to an embodiment of the present disclosure.

Hereinafter, embodiments of the present disclosure will be described with reference to the accompanying drawings, such that this disclosure will be thorough and complete and fully convey the scope of the present disclosure to those skilled in the art.

The present disclosure may be implemented in various manners, and is not limited to embodiments described herein. In the drawings, components which are not related to the descriptions are omitted in order to clearly describe the present disclosure. Throughout the specification, like reference numerals refer to like components. Furthermore, since the sizes and thickness of components in the drawings are arbitrarily set for convenience of description, they are not limited to the drawings.

In the present disclosure, "over/on" indicates that an element is positioned over or under a target member, and does not necessarily indicate that the element is positioned over/on the target member based on the direction of gravity.

Throughout the specification, when an element is referred to as "including" a component, it may indicate that the element does not exclude another component but can include another component, unless referred to the contrary.

Hereafter, a piston for a vehicle engine and a method for manufacturing the same according to embodiments of the present disclosure will be described in detail with reference to the accompanying drawings.

FIG. 1 illustrates a cross-section of a piston for a vehicle engine according to an embodiment of the present disclosure.

Referring to FIG. 1, the piston 1 for an engine vehicle according to the embodiment of the present disclosure may include a piston body 100 formed by diffusion brazing first and second piston parts 110 and 120 (refer to FIG. 2) to each other, the first and second piston parts 110 and 120 being made of forged steel such as precipitation-hardened ferrite-pearlite steel (AFP steel) or heat treated steel such as 42CrMo4. The piston body 100 has a cooling gallery 140 formed at the top thereof, the cooling gallery 140 serving to cool high-temperature heat generated by a combustion process in a cylinder. The piston body 100 has a pin hole 126 formed at the bottom thereof, such that a piston skirt 125 and a piston pin (not illustrated) are housed in the pin hole 126.

In order to form the cooling gallery 140 of the piston 1 for a vehicle engine according to the embodiment of the present disclosure, each of the first and second piston parts 110 and 120 has a plurality of bonding surfaces formed thereon, and the bonding surfaces of the first and second piston parts 110 and 120, facing each other, are bonded to form the cooling gallery 140 in the piston body 100.

Figure 2:
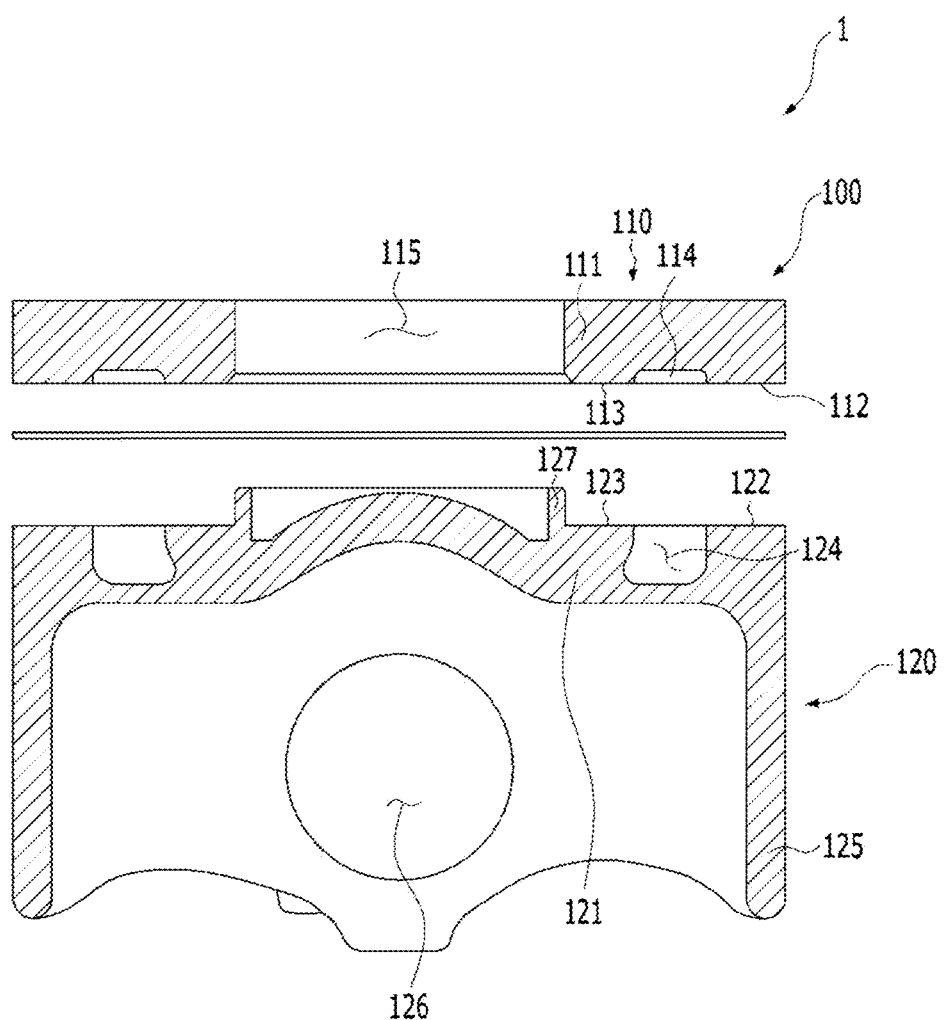
FIG. 2 illustrates the piston before upper and lower piston parts of the piston of FIG. 1 are assembled.
Figure 3:
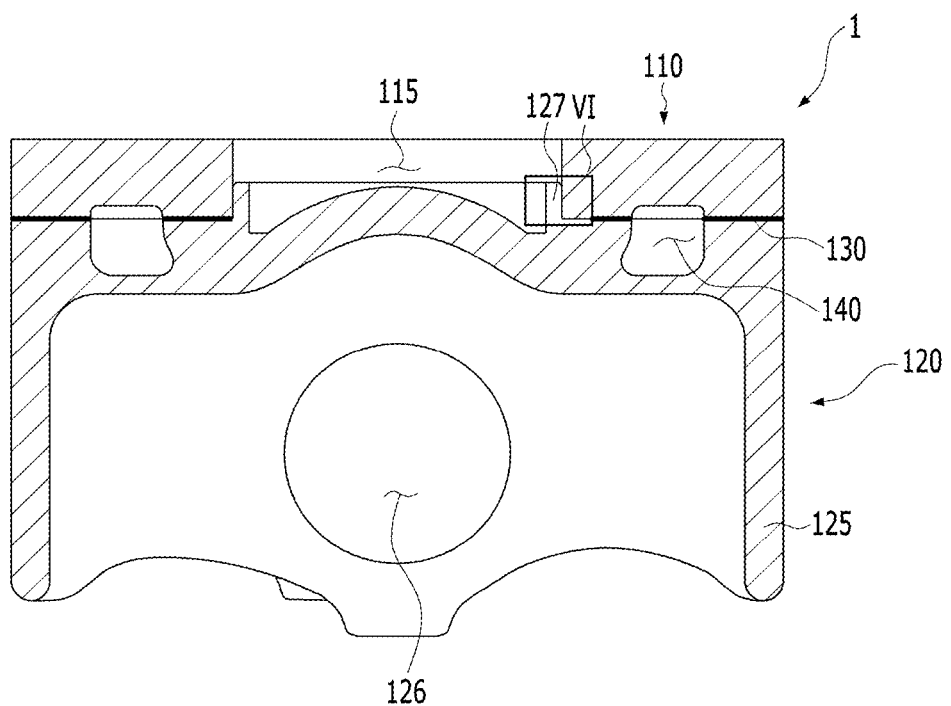
FIG. 3 illustrates a piston assembly in which the upper piston part, the lower piston part and a bonding member of FIG. 2 are assembled.
Figure 4:
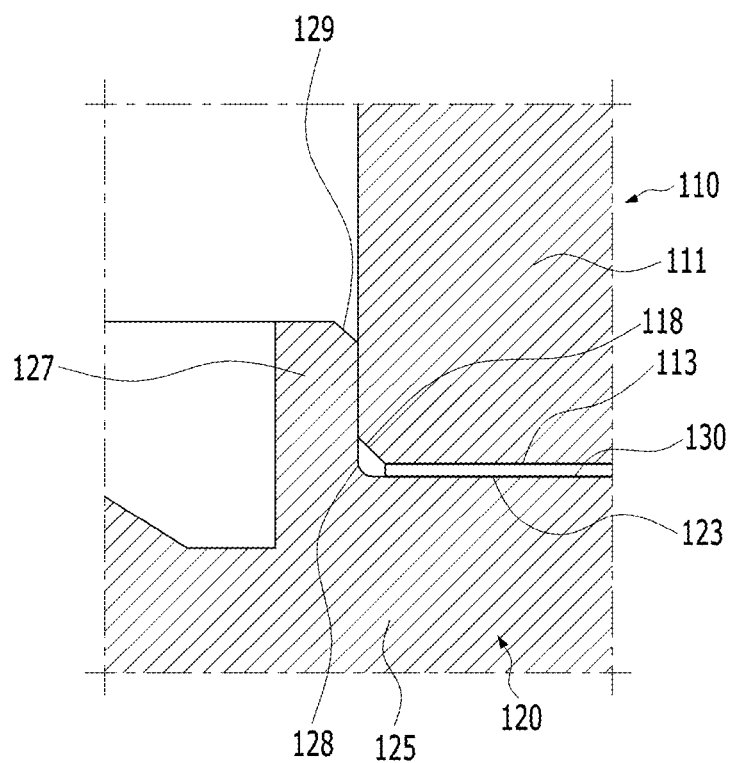
FIG. 4 is an expanded view of a portion VI of FIG. 3.
Figure 5:
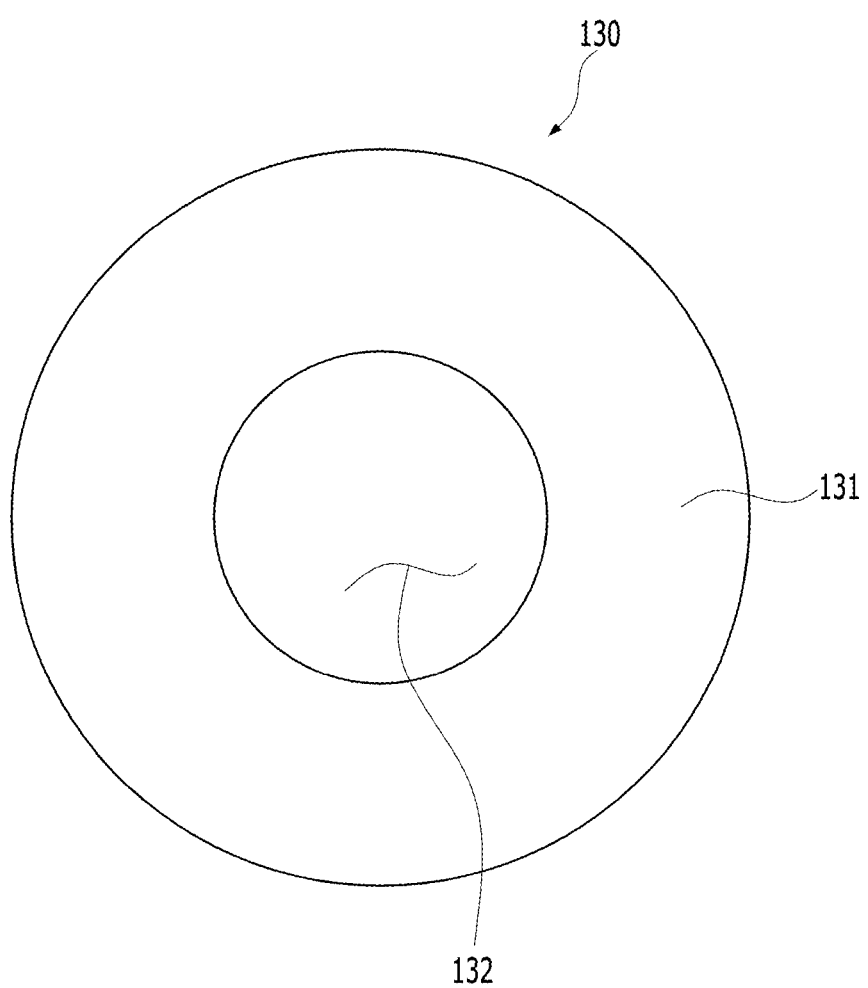
FIG. 5 illustrates the bonding member of FIG. 1.

FIG. 2 illustrates the piston before upper and lower piston parts of the piston for the vehicle engine of FIG. 1 are assembled, and FIG. 3 illustrates a piston assembly in which the upper piston part, the lower piston part and a bonding member of FIG. 2 are assembled. FIG. 4 is an expanded view of a portion VI of FIG. 3, and FIG. 5 illustrates the bonding member of FIG. 1.

Referring to FIGS. 2 to 5, the first piston part 110 forms the upper portion of the piston 1, a combustion cavity 115 is formed at the center of the first piston part 110, and first and second bonding surfaces 112 and 113 extending in the circumferential direction and separate from each other are formed on the bottom surface of the first piston part 110. A first groove 114 is formed between the first and second bonding surfaces 112 and 113. The second bonding surface 113 is disposed at an inner position closer to the center of the first piston part 110 than the first bonding surface 112.

The second piston part 120 forms the lower portion of the piston 1, and the piston skirt 125 and the piston pin hole 126 are formed at the second piston part 120.

Like the first piston part 110, the second piston part 120 has third and fourth bonding surfaces 122 and 123 formed at the top surface thereof, the third and fourth bonding surfaces 122 and 123 extending in the circumferential direction and separate from each other. A second groove 124 is formed between the third and fourth bonding surfaces 122 and 123. The fourth bonding surface 123 is disposed at an inner position closer to the center of the second piston part 120 than the third bonding surface 122.

Furthermore, a latch 127 protrudes upward from the edge of the fourth bonding surface 123, which is separate from the second groove 124. The latch 127 is formed along the circumferential direction or formed in a ring shape. The latch 127 has an outer diameter corresponding to the diameter of the combustion cavity 115 formed through the center of the first piston part 110.

With the first and second piston parts 110 and 120 assembled to each other before diffusion brazing, the latch 127 of the second piston part 120 may be inserted into the combustion cavity 115 of the first piston part 110 so as to cover a portion of the first piston part 110 or specifically the inner circumference of the first piston part 110, which makes it possible to maintain the state in which the first and second piston parts 110 and 120 are matched with each other.

Meanwhile, the first piston part 110 has a first cut portion 118 which is obliquely formed at the inner circumference thereof, that is, at the inner end of the second bonding surface 113, and a rounted portion 128 having a predetermined radius of curvature of 0.2 mm to 0.7 mm, for example, is formed at the connection between the latch 127 and the fourth bonding surface 123 of the second piston part 120. Furthermore, the latch 127 has a second cut portion 129 formed at the upper end thereof, the second cut portion 129 being obliquely formed toward the inner circumference of the first piston part 110.

The first cut portion 118, the second cut portion 129 and the rounted portion 128 can prevent interference between the first and second piston parts 110 and 120 during an assembling process. Thus, an assembling and diffusion brazing process between the first and second piston parts 110 and 120 can be smoothly performed.

In the present embodiment, it has been described that the latch 127 is formed at the second piston part 120. However, the latch 127 may be formed in the first piston part 110, or formed at the outer circumference of the first or second piston part 110 or 120.

With the first and second piston parts 110 and 120 assembled to each other before diffusion brazing, a bonding member 130 is disposed between the first and second piston parts 110 and 120.

The bonding member 130 includes a bonding member body 131 formed in a circular plate shape, and has a through-hole 132 formed at the center of the bonding member body 131. The bonding member 130 may be formed of a nickel-based alloy, for example. In the present embodiment, the bonding member 130 may be formed of a tertiary nickel filler metal. For example, the bonding member 130 may be provided as a metal thin film with a thickness of 50 um to 200 um.

The bonding member body 131 has a diameter corresponding to the diameter of the bottom surface of the first piston part 110 or the top surface of the second piston part 120, and the through-hole 132 has a diameter corresponding to the diameter of the latch 127 formed in the second piston part 120. Therefore, with the first piston part 110, the bonding member 130 and the second piston part 120 assembled to form a piston assembly, arrangement interference between the bonding member 130 and the latch 127 can be suppressed.

When the first piston part 110, the bonding member 130 and the second piston part 120 are assembled to form the piston assembly, one surface of the bonding member 130 is in contact with the first and second bonding surfaces 112 and 113 of the first piston part 110, and the other surface of the bonding member 130 is in contact with the third and fourth bonding surfaces 122 and 123 of the second piston part 120. The first and second bonding surfaces 112 and 113 face the third and fourth bonding surfaces 122 and 123, respectively, with the bonding member 130 interposed therebetween. A portion of the bonding member 130 is positioned between the first groove 114 of the first piston part 110 and the second groove 124 of the second piston part 120.

When the bonding surfaces 112 and 113 and the bonding surfaces 122 and 123 are joined to each other by heating and diffusion brazing the first piston part 110, the bonding member 130 and the second piston part 120, the first groove 114 of the first piston part 110 and the second groove 124 of the second piston part 120 form the cooling gallery 140. At this time, the portion of the bonding member 130, which had been disposed between the first and second grooves 114 and 124, may be diffused to the inside of the cooling gallery 140, thereby forming a diffusion layer 150 (refer to FIG. 10) on the inner surface of the cooling gallery 140, the diffusion layer 150 containing a heterogeneous metal, for example, a nickel-based alloy.

Hereafter, a process of manufacturing the piston 1 according to the embodiment of the present disclosure will be described in detail.

Figure 6:
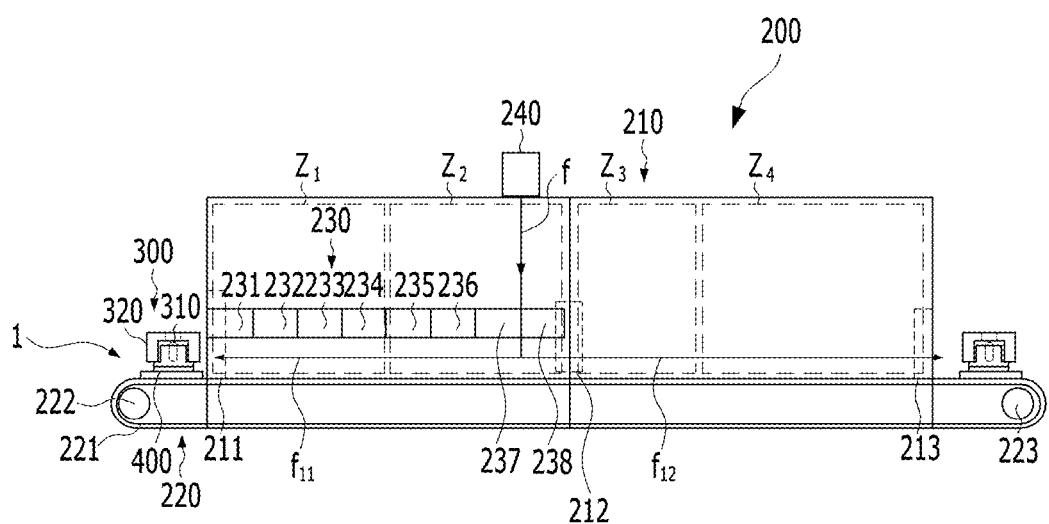
FIG. 6 illustrates a process in which the piston assembly of FIG. 3 is diffusion brazed in a piston manufacturing device.
Figure 7:
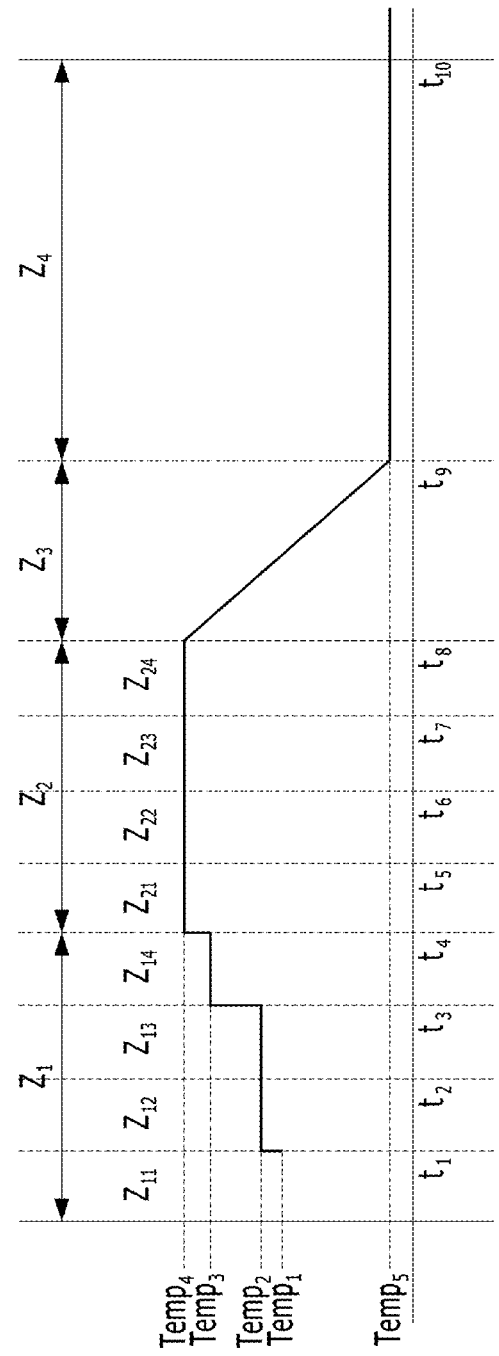
FIG. 7 illustrates an internal temperature distribution of the piston manufacturing device of FIG. 6.

FIG. 6 illustrates a process by which the piston assembly of FIG. 3 is friction brazed in a piston manufacturing device, and FIG. 7 illustrates an internal temperature distribution of the piston manufacturing device of FIG. 6.

In the following descriptions, the piston assembly indicates a state in which the first piston part 110, the bonding member 130 and the second piston part 120 are assembled to each other before diffusion brazing, and a piston unit indicates a state in which the first and second piston parts 110 and 120 of the piston assembly are brazed to each other in the piston manufacturing device 200 (refer to FIG. 6) through a heating process.

Referring to FIGS. 6 and 7, the piston manufacturing device 200 for manufacturing the piston 1 according to the present embodiment includes a manufacturing device body 210, a heater 230 and a moving unit 220. The manufacturing device body 210 includes a heating zone $Z_1$ and $Z_2$ and a cooling zone $Z_3$ and $Z_4$ which are partially opened, the heater 230 provides heat to the heating zone $Z_1$ and $Z_2$, and the moving unit 220 is moved in one direction through the heating zone $Z_1$ and $Z_2$ and the cooling zone $Z_3$ and $Z_4$, with the piston assembly seated on the moving unit 220.

The heating zone $Z_1$ and $Z_2$ communicates with the outside of the piston manufacturing device 200 through a first opening 211 so as to form an open atmosphere, and communicates with the cooling zone $Z_3$ and $Z_4$ through a second opening 212. That is, the heating zone $Z_1$ and $Z_2$ are formed as a heating furnace which is partially opened.

At this time, the first and second openings 211 and 212 may be formed so as not to open the entire heating zone $Z_1$ and $Z_2$. In other words, the first and second openings 211 and 212 may partially open the heating zone $Z_1$ and $Z_2$ such that the moving unit 220 and the piston assembly can be moved.

The heating zone $Z_1$ and $Z_2$ includes a preheating zone $Z_1$ and a main heating zone $Z_2$ which communicate with each other. The preheating zone $Z_1$ is located at the front of the heating zone $Z_1$ and $Z_2$ or located adjacent to the first opening 211, and the main heating zone $Z_2$ may be disposed at the rear of the preheating zone $Z_1$.

The preheating zone $Z_1$ includes a plurality of sub preheating zones $Z_{11}$ to $Z_{14}$ disposed in the moving direction of the moving unit 220.

Similarly, the main heating zone $Z_2$ includes a plurality of sub main heating zones $Z_{21}$ to $Z_{24}$ disposed in the movement direction of the moving unit 220.

The heater 230 provides high-temperature heat generated by electricity or combustion to the heating zone $Z_1$ and $Z_2$, and includes a plurality of heating units 231 to 238. The piston assemblies moved at a predetermined speed through the heating zone $Z_1$ and $Z_2$ may be successively preheated by the heat supplied from the heater 230, and then brazed.

At this time, the plurality of heating units 231 to 238 may be arranged in the plurality of sub preheating zones $Z_{11}$ to $Z_{14}$ and the plurality of sub main heating zones $Z_{21}$ to $Z_{24}$, respectively, and each of the heating units 231 to 238 may provide a different amount of heat from the other heating units, such that the internal temperatures of the sub preheating zones $Z_{11}$ to $Z_{14}$ and the sub main heating zones $Z_{21}$ to $Z_{24}$ are different from one another. The sub preheating zones $Z_{11}$ to $Z_{14}$ and the sub main heating zones $Z_{21}$ to $Z_{24}$ may have the same length in one direction or specifically in the movement direction of the moving unit 220. Therefore, while the piston assembly is moved by the moving unit 220, the piston assembly stays in each of the sub preheating zones $Z_{11}$ to $Z_{14}$ and the sub main heating zones $Z_{21}$ to $Z_{24}$ for the same time.

In the present embodiment, the internal temperature of the first sub preheating zone $Z_{11}$ of the sub preheating zones $Z_{11}$ to $Z_{14}$ may be set to a first preheating temperature $Temp_1$, the internal temperature of the second sub preheating zone $Z_{12}$ may be set to a second preheating temperature $Temp_2$, the internal temperature of the third sub preheating zone $Z_{13}$ may be set to the second preheating temperature $Temp_2$, and the internal temperature of the fourth sub preheating zone $Z_{14}$ may be set to a third preheating temperature $Temp_3$.

The first to third preheating temperatures $Temp_1$ to $Temp_3$ have a relation of
$Temp_1 < Temp_2 < Temp_3$. The first to third preheating temperatures $Temp_1$ to $Temp_3$ are lower than the melting temperature of the bonding member 130, and the third preheating temperature $Temp_3$ is close to the melting temperature of the bonding member 130.

For example, the first preheating temperature $Temp_1$ may range from 500° C. to 800° C., and the second and third preheating temperatures $Temp_2$ and $Temp_3$ may range from 800° C. to 1,200° C.

That is, since the piston assembly is preheated in the preheating zones $Z_{11}$ to $Z_{14}$, the temperature of the entire area of the bonding member 130 assembled to the piston assembly may uniformly rise to a temperature close to the melting temperature.

Meanwhile, the internal temperatures of the respective sub main heating zones $Z_n$ to $Z_{14}$ are uniformly maintained at a main heating temperature $Temp_4$. At this time, the main heating temperature $Temp_4$ is higher than the melting temperature of the bonding member 130, and may range from 1,000° C. to 1,300° C., for example.

In the present embodiment, the bonding member 130 may be made of a tertiary nickel filler metal. In this case, the melting temperature of the bonding member 130 may range from 950° C. to 1,070° C., for example. The first to third preheating temperatures $Temp_1$ to $Temp_3$ are set to lower temperatures than the range of 950° C. to 1,070° C., which corresponds to the melting temperature of the bonding member 130, and the main heating temperature $Temp_4$ is set to a higher temperature than the melting temperature.

While the piston assembly is subjected to the main heating step in the main heating zone $Z_2$, the bonding member 130 disposed between the first and second piston parts 110 and 120 of the piston assembly is melted and diffused into the first and second piston parts 110 and 120, such that the bonding surfaces 112 and 113 of the first piston part 110 and the bonding surfaces 122 and 123 of the second piston part 120 are reliably brazed to each other.

The cooling zone $Z_3$ and $Z_4$ includes a first cooling zone $Z_3$ and a second cooling zone $Z_4$ communicating with the first cooling zone $Z_3$.

The first cooling zone $Z_3$ communicates with the heating zone $Z_1$ and $Z_2$ through the second opening 212, and the piston unit moved to the first cooling zone $Z_3$ through the second opening 212 is subjected to a first cooling step. The internal temperature of the first cooling zone $Z_3$ rapidly decreases toward the rear side or the second cooling zone $Z_4$ from the front side or the second opening 212. That is, the internal temperature of the first cooling zone $Z_3$ decreases from the main heating temperature $Temp_4$ to a cooling temperature $Temp_5$. At this time, the cooling temperature $Temp_5$ may range from 10° C. to 100° C., for example. Therefore, the piston unit is rapidly cooled through the first cooling step.

At this time, in order to rapidly lower the internal temperature of the first cooling zone $Z_3$, low-temperature cooling gas may be supplied to the first cooling zone $Z_3$.

The internal temperature of the second cooling zone $Z_4$ is maintained at a cooling temperature $Temp_5$, and the piston unit is subjected to a second cooling step in the second cooling zone $Z_4$. At the second cooling step, the piston unit may be cooled at a lower speed than at the first cooling step. The second cooling zone $Z_4$ may communicate with the outside through a third opening 213.

The length of the second cooling zone $Z_4$ in the one direction is larger than the length of the first cooling zone $Z_3$ in the one direction. Therefore, when the piston unit is moved through the first and second cooling zones $Z_3$ and $Z_4$ at the same speed, the second cooling step performed in the second cooling zone $Z_4$ may be performed for a longer time than the first cooling step. For example, the time during which one piston unit stays in the first cooling zone $Z_3$ may be two to four times longer than the time during which the same piston unit stays in the second cooling zone $Z_4$.

In the present embodiment, the cooling zone $Z_3$ and $Z_4$ is described as a closed space except the second and third openings 212 and 213. However, the entire cooling zone $Z_3$ and $Z_4$ may be formed as an open atmosphere without the third opening 213.

The moving unit 220 moves the piston assembly in one direction, such that the piston assembly is brazed and cooled while being moved through the heating zone $Z_1$ and $Z_2$ and the cooling zone $Z_3$ and $Z_4$.

The moving unit 220 may include a moving mechanism using a conveyer belt, for example, and have a conveyer belt 221 and power units 222 and 223. The conveyer belt 221 is moved in one direction with the plurality of piston assemblies seated thereon, and the power units 222 and 223 provide a rotational force to move the conveyer belt 221 in the one direction. The conveyer belt 221 according to the present embodiment may be moved at a speed of 5 to 30 cm/min, for example.

Between the top surface of the conveyer belt 221 and the piston assembly, a plate-shaped seating member 400 is disposed. Thus, the piston assembly may be stably seated on the seating member 400 while a damage of the piston assembly is prevented.

The piston assembly including the first piston part 110, the bonding member 130 and the second piston part 120, which are sequentially stacked therein, is seated on the conveyer belt 221. That is, the piston assembly, in which the first piston part 110 having the combustion cavity 115 formed therein is positioned at the bottom and the second piston part 120 having the piston skirt 125 and the pin hole 216 formed therein is positioned at the top, is seated on the conveyer belt 221. The boundary surface between the first and second piston parts 110 and 120 may be located at a lower position than the center of gravity of the piston assembly, such that the piston assembly can be more stably transferred.

Meanwhile, when the heating zone $Z_1$ and $Z_2$ of the piston manufacturing device 200 is partially opened, the surface of the piston assembly may be oxidized while the piston assembly is subjected to the high-temperature heating step in the opened heating zone $Z_1$ and $Z_2$.

Therefore, the piston manufacturing device 200 which performs the method for manufacturing a piston according to the embodiment of the present disclosure further includes a gas mixture supply unit 240. The gas mixture supply unit 240 supplies a gas mixture into the heating zone $Z_1$ and $Z_2$, and the gas mixture supplied to the heating zone $Z_1$ and $Z_2$ suppresses an oxidation of the piston assemblies moved through the heating zone $Z_1$ and $Z_2$, and is discharged to the outside.

The gas mixture supply unit 240 has a supply flow path $f_1$ that is formed downward from a gas discharge port (not illustrated) disposed between the third and fourth sub main heating zones $Z_{23}$ and $Z_{24}$, for example. That is, the supply flow path $f_1$ of the gas mixture is disposed at the rear of the heating zone $Z_1$ and $Z_2$ adjacent to the cooling zone $Z_3$ and $Z_4$.

The gas mixture introduced into the heating zone $Z_1$ and $Z_2$ may be discharged to the outside through a discharge flow path $f_{11}$ and $f_{12}$ in the heating zone $Z_1$ and $Z_2$, facing the first and second openings 211 and 212.

The gas mixture may include a gas mixture of nitrogen and hydrogen, for example. In this case, a combustion unit (not illustrated) for removing the hydrogen may be installed at the first and second openings 211 and 212 or the third opening 213. Since nitrogen is an inert gas and hydrogen is a reduction gas, the gas mixture according to the present embodiment may be supplied to the heating zone $Z_1$ and $Z_2$, in order to suppress an oxidation of the piston assemblies during the heating process.

In the present embodiment, since the piston assemblies are successively transferred into the piston manufacturing device 200 and then brazed and cooled therein, the productivity can be further improved.

Meanwhile, when the method for manufacturing a piston according to the present embodiment is applied, the matching state of the piston needs to be maintained because the piston assembly is heated and brazed while being moved by the moving unit 220. Hereafter, a configuration for maintaining the matching state of the piston assembly while the piston assembly is moved will be described in detail.

Figure 8:
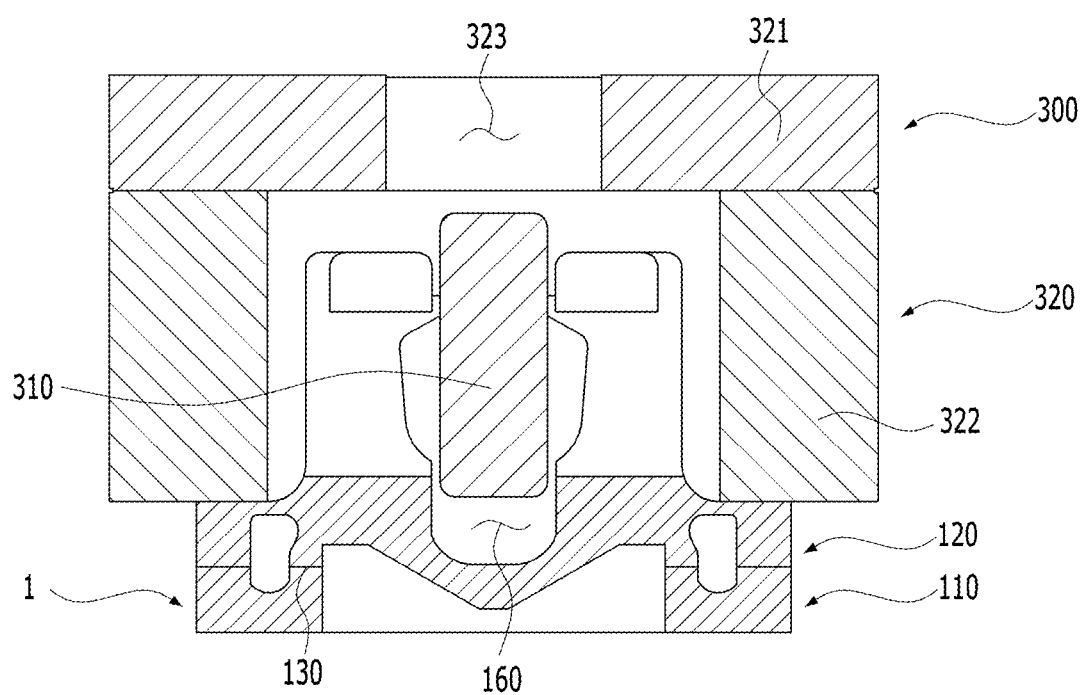
FIG. 8 is a cross-sectional view illustrating that the piston assembly is held by a jig when the piston assembly is seated in the piston manufacturing device of FIG. 6.

FIG. 8 is a cross-sectional view illustrating that the piston assembly is held by a jig when the piston assembly is seated in the piston manufacturing device of FIG. 6.

Referring to FIG. 8, the piston assembly assembled through the manufacturing method according to the present embodiment is seated on the conveyer belt 221 of the piston manufacturing device 200, and a jig 300 is installed on the piston assembly to press the second piston part 120 against the first piston part 110. Thus, the matching state of the piston assembly may be stably maintained.

The jig 300 includes a first jig 310 and a second jig 320 which are made of a heavy-weight metallic material.

The first jig 310 is disposed at the center hole 160 of the second piston part 120, and presses the second piston part 120 against the first piston part 110.

The second jig 320 includes a second jig body 321 having a through-hole 323 formed therein and a pair of pressing parts 322 which extend downward from both ends of the second jig body 321 and are in contact with one surface of the head part 129 of the second piston part 120. With the second jig 320 installed on the piston assembly, the second jig body 321 is separate at a predetermined distance from the piston assembly. Through the through-hole 323 formed in the second jig body 321, the heat of the heating zone $Z_1$ and $Z_2$ may be smoothly transmitted to the piston assembly.

According to the present embodiment, the jig 300 may provide a uniform pressing force for the piston assembly while the first jig 310 of the jig 300 presses the central portion of the piston assembly and the second jig 320 presses the edge portion of the piston assembly.

FIGS. 9A and 9B illustrate the metal texture sizes of the piston before and after the piston manufacturing process by the piston manufacturing device of FIG. 6.

FIG. 9A is an optical microscope image of a metal texture formed at a cross-section of the piston assembly, before the piston 1 according to the present embodiment is subjected to diffusion brazing, and FIG. 9B is an optical microscope image of a metal texture formed at a cross-section of the piston unit, after the piston 1 is subjected to diffusion brazing and cooling.

Referring to FIGS. 9A and 9B, a pearlite structure $G_1$ in the metal texture formed in the first or second piston part 110 and/or 120 has a grain size corresponding to a first size $W_1$, before the manufacturing process by the method for manufacturing a piston according to the present embodiment.

After the manufacturing process, a pearlite structure $G_2$ in the metal texture formed in the piston unit has a grain size corresponding to a second size $W_2$.

At this time, the first size $W_1$ is larger than the second size $W_2$. For example, the first size $W_1$ ranges from 64 um to 90 um, and the second size $W_2$ ranges from 32 um to 45 um.

Furthermore, the hardness of the piston 1 subjected to the manufacturing process by the piston manufacturing method according to the present embodiment has risen by about 2% to 5% from the hardness of the piston assembly before the manufacturing process.

When the piston manufacturing method according to the present embodiment is applied, the particle size of the metal texture of the piston 1 is reduced while the hardness thereof is increased.

Figure 10:
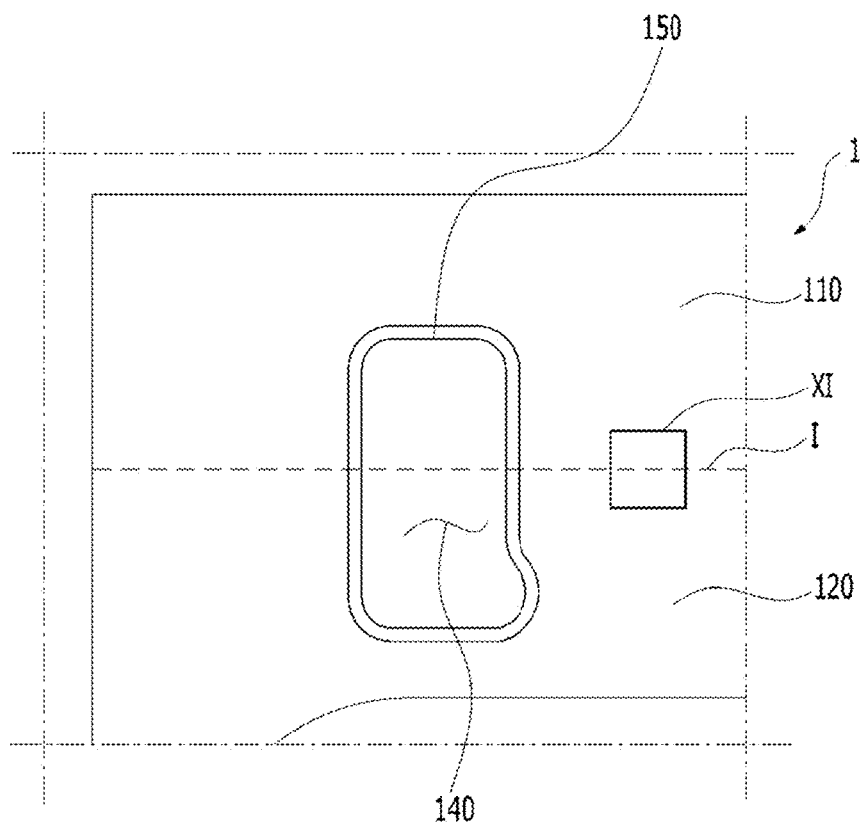
FIG. 10 is a cross-sectional view illustrating the cooling gallery of the piston unit formed by diffusion brazing the piston assembly in the piston manufacturing device of FIG. 6.
Figure 11:
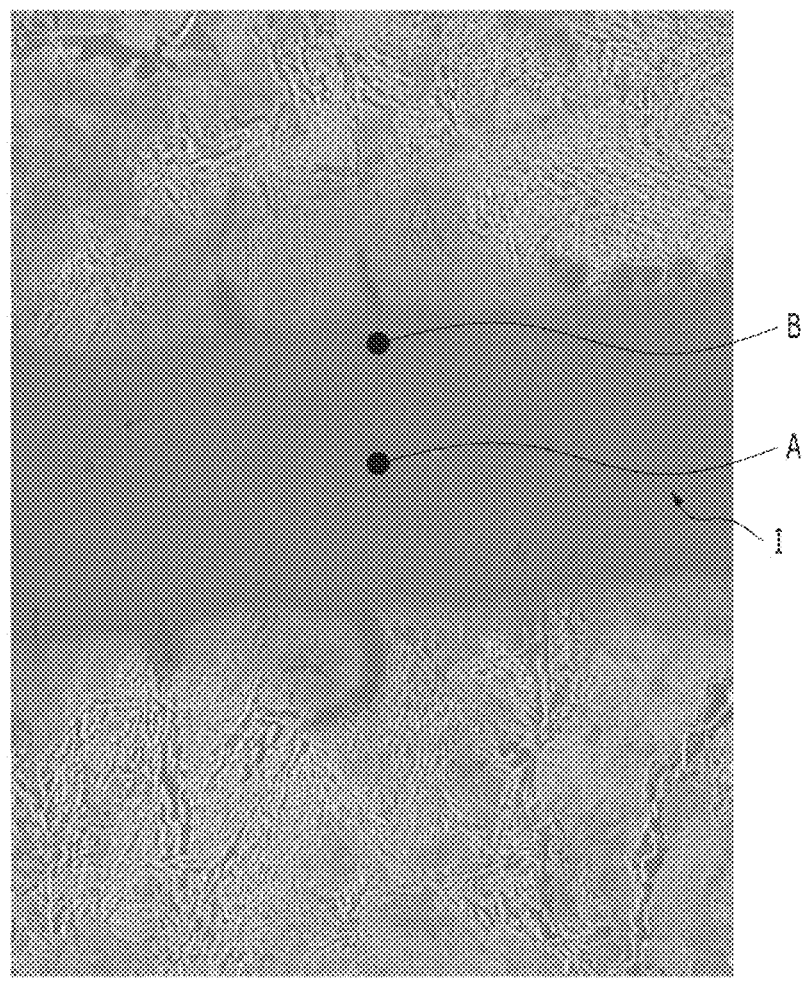
FIG. 11 is an expanded view of a portion XI of FIG. 10.

FIG. 10 is a cross-sectional view illustrating the cooling gallery of the piston unit formed by diffusion brazing the piston assembly in the piston manufacturing device of FIG. 6, and FIG. 11 is an expanded view of a portion XI of FIG. 10.

Referring to FIGS. 10 and 11, the cooling gallery 140 of the piston 1 manufactured through the manufacturing method according to the present embodiment has a diffusion layer 150 formed on the inner surface thereof, the diffusion layer 150 being formed by diffusion of a portion of the bonding member 130.

The diffusion layer 150 may include a heterogeneous metal made of a nickel-based alloy contained in the bonding member 130. The formation of the diffusion layer 150 on the inner surface of the cooling gallery 140 can improve the heat conductivity and corrosion resistance of the cooling gallery 140.

Meanwhile, the piston body of the piston 1 has a bonding interface I formed in parallel to the top surface of the piston body and passing through the cooling gallery 140.

The bonding interface I is formed through a bonding between the bonding surfaces of the first and second piston parts 110 and 120, as the bonding member 130 is melted and diffused. From the center A of the bonding interface I toward the outside B of the bonding interface I, the concentration of the metal which is different from the material of the piston body formed of steel, for example, nickel decreases.

Table 1 shows data obtained by analyzing the components of the bonding interface of the piston of FIG. 11.

TABLE 1

| Location | C (%) | Si (%) | Fe (%) | Ni (%) |
|---|---|---|---|---|
| A | 1.83 | 8.98 | 14.34 | 74.56 |
| B | 1.36 | 2.21 | 42.13 | 54.3 |

That is, when the piston manufacturing method according to the present embodiment is applied, metal diffusion may be smoothly performed at the bonding interface I where the bonding member 130 had been disposed. Therefore, the first and second piston parts 110 and 120 may be stably brazed.

Figure 12:
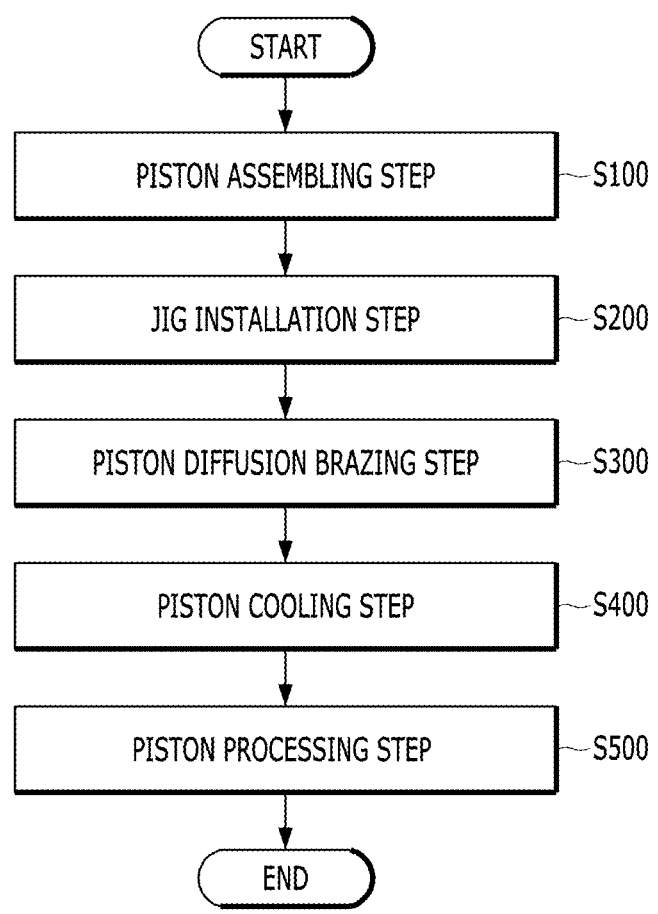
FIG. 12 illustrates a method for manufacturing a piston for a vehicle engine according to an embodiment of the present disclosure.

FIG. 12 illustrates a method for manufacturing a piston for a vehicle engine according to an embodiment of the present disclosure.

Referring to FIG. 12, the method for manufacturing a piston for a vehicle engine according to the present embodiment begins with a piston installation step S100 of aligning the first piston part 110, the bonding member 130 and the second piston part 120 to assemble the piston assembly.

Then, the jig 300 is installed on the piston assembly, in order to stably maintain the alignment state of the piston assembly, at a jig installation step S200.

Then, the piston assemblies are seated on the conveyer belt 221 of the piston manufacturing device 200, and successively brazed while being heated in the heating zone $Z_1$ and $Z_2$ of the piston manufacturing device 200, at a piston diffusion brazing step S300.

The piston diffusion brazing step S300 includes a preheating step of heating the piston assembly almost to the melting point of the bonding member 130 and a main heating step of heating the piston assembly preheated through the preheating step at a main heating temperature higher than the melting temperature of the bonding member 130, such that the first and second piston parts 110 and 120 are brazed to each other by diffusion of the bonding member 130.

At this time, the main heating temperature is higher than the melting temperature of the bonding member 130 or lower than the melting temperature of the base material, that is, the first and second piston parts 110 and 120.

Then, the piston unit formed by diffusion brazing the piston assembly is cooled at a piston cooling step S400.

The piston cooling step S400 includes a first cooling step of rapidly cooling the piston unit which has been heated to the main heating temperature through the main heating step and a second cooling step of cooling the piston unit cooled through the first cooling step to the cooling temperature.

Then, the latch 127 protruding toward the combustion cavity 115 of the piston unit which has been completely cooled is removed to process the piston unit, at a piston processing step S500. The piston processing step S500 may include a cutting work, for example. At this time, the piston processing step S500 may also be referred to as a latch removing step.

According to the present embodiment, the piston made of steel may be manufactured by the brazing method. Thus, the upper and lower piston parts can be brazed to each other without flashing.

Furthermore, as the piston manufacturing process is performed under an open atmosphere, piston diffusion brazing can be successively performed to improve the manufacturing efficiency of the piston.

Although the representative embodiments of the present disclosure have been disclosed in detail, those having ordinary skill in the field of technology to which the present disclosure pertains would understand that various modifications are possible, without departing from the scope of the present disclosure. Accordingly, the scope of the present disclosure should not be construed as being limited to the described embodiments but be defined by the appended claims as well as equivalents thereof.

What is claimed is:

1. A method for manufacturing a piston, comprising:
a piston assembling step of forming a piston assembly by assembling a first piston part, a bonding member and a second piston part, wherein the first piston part has two or more bonding surfaces separate from each other and extending in a circumferential direction, and the second piston part has two or more bonding surfaces separate from each other and extending in the circumferential direction;
a piston diffusion brazing step of diffusion brazing the first piston part, the bonding member and the second piston part, wherein the piston diffusion brazing step comprises: a first heating step of heating the piston assembly formed at room temperature to a first temperature from the room temperature, the first temperature being lower than the melting temperature of the bonding member, and a second heating step of diffusion brazing the first piston part, the bonding member and the second piston part of the piston assembly by heating the piston assembly heated to the first temperature through the first step to a second temperature higher than the melting temperature of the bonding member; and
a piston cooling step of cooling a piston unit formed by diffusion brazing the first piston part, the bonding member and the second piston part.

2. The method of claim 1, wherein in the piston assembling step,
the bonding surfaces of the first piston part comprise a ring-shaped first bonding surface and a second bonding surface disposed further inside than the first bonding surface,
the bonding surfaces of the second piston part comprise a ring-shaped third bonding surface and a fourth bonding surface disposed further inside than the third bonding surface, and
the first and second bonding surfaces of the first piston part face the third and fourth bonding surfaces of the second piston part, respectively, with the bonding member interposed therebetween.

3. The method of claim 2, wherein the bonding member comprises a bonding member body formed in a circular plate shape, and has a through-hole formed at a center of the bonding member body, and
one surface of the bonding member body is in contact with the first and second bonding surfaces, and the other surface of the bonding member body is in contact with the third and fourth bonding surfaces.

4. The method of claim 3, wherein the first and second piston parts comprise steel, and the bonding member comprises a nickel-based alloy,
wherein in the piston diffusion brazing step,
a diffusion layer containing a nickel-based alloy is formed on the inner surface of a cooling gallery formed by bonding the first and second bonding surfaces of the first piston part and the third and fourth bonding surfaces of the second piston part, respectively.

5. The method of claim 1, wherein the first heating step is performed in a preheating zone of the heating zone, the preheating zone including two or more sub preheating zones,
a first preheating temperature of a first sub preheating zone is lower than a second preheating temperature of a second sub preheating zone disposed at the rear of the first sub preheating zone, and
the first temperatures of the sub preheating heating zones are constantly maintained.

6. The method of claim 5, wherein the first preheating temperature is higher than 500° C. and lower than 800° C., and
the second preheating temperature is higher than 800° C. and lower than 1,200° C.

7. The method of claim 5, wherein the second heating step is performed in a main heating zone which is disposed at the rear of the preheating zone of the heating zone and communicates with the preheating zone, and
the main heating zone has an internal temperature maintained at the second heating temperature.

8. The method of claim 7, wherein the second heating temperature is higher than 1,000° C. and lower than 1,300° C.

9. The method of claim 1, wherein the second piston part comprises a piston skirt and a piston pin hole, and
the piston assembly belongs to a plurality of piston assemblies each including the first piston part, the bonding member and the second piston part, which are sequentially stacked, are successively moved by the moving unit.

10. The method of claim 9, further comprising a jig installation step of installing a jig for maintaining an alignment state of the first piston part, the bonding member and the second piston part, after the piston assembly is formed,
wherein the jig presses the second piston part against the first piston part.

11. The method of claim 1, wherein a gas mixture is supplied to the heating zone, and then discharged externally through the heating zone.

12. The method of claim 11, wherein the heating zone comprises a preheating zone and a main heating zone disposed at the rear of the preheating zone, and
the gas mixture is introduced into the heating zone through a gas discharge port installed in the main heating zone.

13. A piston manufacturing device, comprising:
a partially opened heating zone;
a heater for providing heat into the heating zone; and
a moving unit which is configured to move in one direction in the heating zone
wherein the heating zone comprises: a first heating zone to heat a piston assembly comprising a first piston part, a bonding member and a second piston part formed at room temperature to a first temperature from the room temperature, the first temperature being lower than the melting temperature of the bonding member, and a second heating zone to heat the piston assembly heated to the first temperature in the first heating zone to a second temperature higher than the melting temperature of the bonding member, wherein the piston manufacturing device is configured such that, in a piston diffusion brazing step, the piston assembly is heated while being moved at a predetermined speed through the heating zone in the one direction by the moving unit, wherein the piston manufacturing device further comprises a cooling zone disposed at a rear side of the heating zone and having first and second cooling zones communicating with each other, wherein the first cooling zone has an internal temperature that decreases to a cooling temperature from the first temperature higher than the melting temperature of the bonding member, and the second cooling zone communicates with the first cooling zone and has an internal temperature maintained at the cooling temperature.

14. The piston manufacturing device of claim 13, wherein the time during which one piston unit stays in the second cooling zone is two to four times longer than the time during which the same piston unit stays in the first cooling zone.

15. The method of claim 1, wherein any one of the first and second piston parts further comprises a latch protruding in a ring shape to cover a portion of the other piston part, and
the method further comprises a piston processing step of removing the latch from the cooled piston unit.

16. The method of claim 1, wherein the piston unit subjected to the piston cooling step has a smaller metal grain size than the piston assembly before the piston assembling step.

17. The method of claim 1, wherein the piston diffusion brazing step is performed in a piston manufacturing device which includes a partially opened heating zone, a heater for providing heat into the heating zone, and a moving unit moved in one direction in the heating zone, and
in the piston diffusion brazing step, the piston assembly is heated while being moved at a predetermined speed through the heating zone in one direction by the moving unit.

* * * * *